United States Patent [19]

Hoover

[11] 4,166,213

[45] Aug. 28, 1979

[54] SINGLE POWER SUPPLY MULTIPLE IMAGE INTENSIFIER APPARATUS AND METHOD WITH INDEPENDENTLY ADJUSTABLE LOW LIGHT GAIN AND HIGH LIGHT SATURATION LEVEL

[75] Inventor: Alan W. Hoover, Hollins, Va.

[73] Assignee: International Telephone and Telegraph Corporation, Nutley, N.J.

[21] Appl. No.: 814,007

[22] Filed: Jul. 8, 1977

[51] Int. Cl.² .............................................. H01J 31/50
[52] U.S. Cl. ................................. 250/213 VT; 315/10
[58] Field of Search ..... 250/213 R, 213 VT, 203 CT, 250/207, 347; 313/94, 99, 102; 315/10

[56] References Cited

U.S. PATENT DOCUMENTS

| 3,694,659 | 9/1972 | Ramsay et al. | 315/10 |
| 3,816,744 | 6/1974 | Chow | 250/213 VT |
| 4,037,132 | 7/1977 | Hoover | 250/213 VT |

Primary Examiner—David C. Nelms
Attorney, Agent, or Firm—John T. O'Halloran; Jeffrey P. Morris

[57] ABSTRACT

Apparatus and method for operating a plurality of image intensifiers from a single power supply wherein the total effective intensifier power coupled to said plurality of image intensifiers is sensed and used to derive automatic brightness control for said plurality of image intensifiers. A circuit for independently adjusting the image intensifier low light level gain and the high light level saturation point is provided to enable the provision of image intensifiers in night vision goggle systems without the need to match image intensifier tube characteristics prior to assembly into goggles.

26 Claims, 3 Drawing Figures

SINGLE POWER SUPPLY MULTIPLE IMAGE INTENSIFIER APPARATUS AND METHOD WITH INDEPENDENTLY ADJUSTABLE LOW LIGHT GAIN AND HIGH LIGHT SATURATION LEVEL

CROSS-REFERENCE TO RELATED APPLICATIONS

The following U.S. Patent applications assigned to the same assignee as the instant application are referenced and incorporated in part herein for purposes of illustrating the background of the invention and the state of the art.

U.S. Pat. No. 4,037,132, issued July 19, 1977.

U.S. patent application, Ser. No. 646,798 filed Jan. 6, 1976 of Alan W. Hoover, now continuation application, Ser. No. 795,262, filed May 9, 1977.

U.S. patent application, Ser. No. 650,110 filed Jan. 19, 1976 of Alan W. Hoover now continuation application, Ser. No. 795,261, filed May 9, 1977, now abandoned.

BACKGROUND OF THE INVENTION

1. Field of the Invention

The present invention relates to power supplies for image intensifiers wherein two or more image intensifiers are coupled to a single power supply of the type in which changes in total intensifier power relative to intensifier input illumination are sensed by a current detector to provide a negative feedback signal for controlling the intensifier input voltage, to regulate the operating voltages applied to the intensifier which in turn regulates the image intensifier output light intensity. The present invention also relates to multiple image intensifier systems as aforedescribed wherein the high light saturation level and low light gain response of the image intensifiers are independently adjustable. The foregoing are advantageously incorporated into night-vision goggle systems.

2. Description of the Prior Art

Image intensifier tubes of the prior art have widely varying characteristics, among which are overall gain at low light levels and high light level saturation characteristics. This is particularly the case with image intensifiers of the microchannel plate electron multiplier type, due to the variation in physical properties from intensifier to intensifier of the materials used in the microchannel plate construction and the change in electrical characteristics thereof with changing ambient temperature and changing input power supply voltage. Accordingly, such image intensifiers require a controlled variation in input voltage thereto with changing ambient temperature and a regulated power supply voltage to prevent decreasing intensifier lightness with decreasing input voltage, as could occur with extended use with a battery. Additionally, the response to light variation of intensifiers used in pairs, such as in night-vision goggles, has heretofore required separate power supplies, one supply for each image intensifier, due to the foregoing and due to the prior art power supply systems, which sense current on the high voltage side of the power supply, in the nanoamp range rather than on the low voltage side of the supply, in the milliamp range as in the present invention. Further, prior art systems not based upon total tube current control could not distinguish between tubes, hence could control only a single tube. In contrast, the present system provides a single supply, with separate ac to dc converters and voltage multipliers for each intensifier tube. Thus, while prior art systems attempted to detect screen currents in the nanoamp range, with their attendant leakage and crosstalk problems, the present invention detects total current level of two or more intensifier tubes. By detecting the effective change in power demand by each intensifier tube with changing light level, and limiting the power supplied to the tubes, a simplified power supply is provided. It has been heretofore unexpected that there would be sufficient change in current demand with increasing light level to control the output light level. Furthermore, it had been heretofore unexpected that by utilizing constant current control on the primary side of the power supply, and in a multi-tube system, that the high light level saturation characteristics would be relatively constant over a wide range, i.e. approximately five decades of tube input light illumination in ft. candles, and that the changes in operating power of one tube could be distinguished from another.

SUMMARY OF THE INVENTION

The present invention relates to apparatus and method for operating a plurality of image intensifiers from a single power supply such as in a night-vision goggle system wherein a pair of image intensifiers are utilized. Separate high-voltage multipliers are provided for each image intensifier tube in a power supply incorporating an automatic brightness control responsive to variations in the total effective power consumed by two or more image intensifier tubes. The proportional change in voltage on both image intensifiers in a goggle system due to increasing light input is equalized. The use of separate high-voltage multipliers allows the high light saturation level and low-light level gain characteristics for each tube to be independently set, thereby resulting in an improved and less costly power supply, particularly suitable for use in night-vision goggle systems wherein a single power supply may be utilized for each of the image intensifier tubes in the goggle. Variation in total tube power are sensed on the low voltage side of the power supply, which incorporates a preregulator for voltage stabilization and temperature compensation circuitry.

Other features and advantages of the invention will become apparent with reference to the accompanying figures, wherein:

DESCRIPTION OF THE PREFERRED EMBODIMENT

Figure 1:
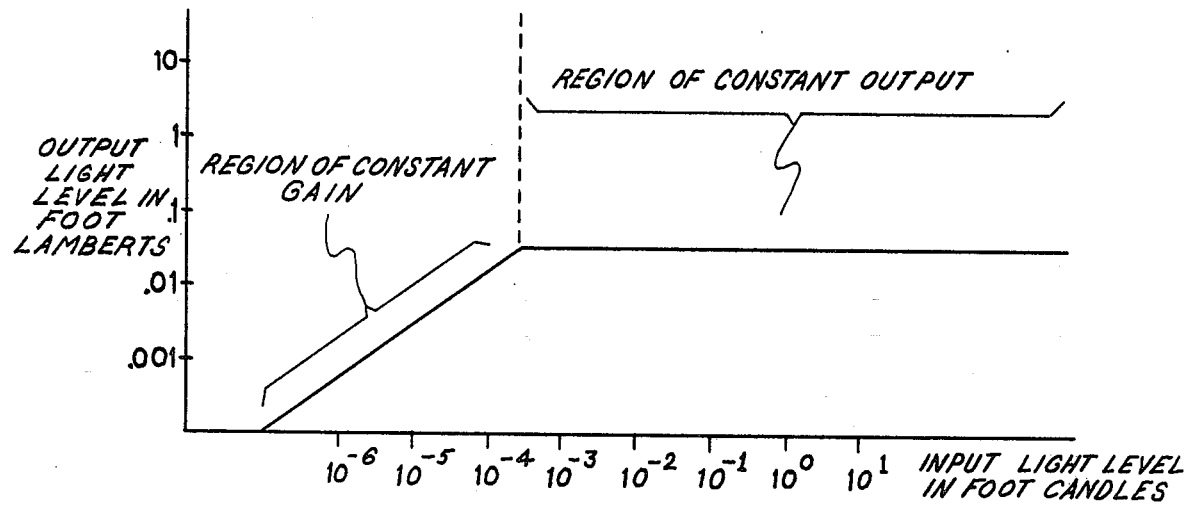
FIG. 1 is a graph illustrative of the light response characteristics of image intensifier tubes supplied with operating voltages and currents in accordance with the present invention.

Referring now to FIG. 1, the light response characteristics of a typical image intensifier tube of the microchannel plate type operable in accordance with the present invention is illustrated. In accordance with the present invention, each of the image intensifiers supplied with operating power hereby functions with like light response characteristics. Under conditions of no light input, a fixed level of input current, the quiescent current, is demanded by the tube power supply, and is determined chiefly by system losses and microchannel plate current demand. As the input light level increases in the range of $10^{-7}$ to $10^{-4}$ foot candles, the output light level shows a proportional increase. This is a region of constant gain and is characterized by increased power demand by the intensifier. As the input light level continues to increase, the power demand of the intensifier also continues to increase. This increase in power demend by the intensifier is reflected back through the power supply to the dc input and is detected and used to control the voltage applied to the image intensifier. If the voltage on the intensifier elements is decreased as the light induced tube current increases, the output light level will remain relatively constant throughout a region of constant output. The provided automatic brightness control circuits insures that the microchannel plate potential and the acceleration potential between the microchannel plate and screen varies in such a way that relatively constant power is supplied to the phosphor and a constant output is maintained in the region of constant output which is referred to as the high light-level saturation level or saturation point.

Figure 2:
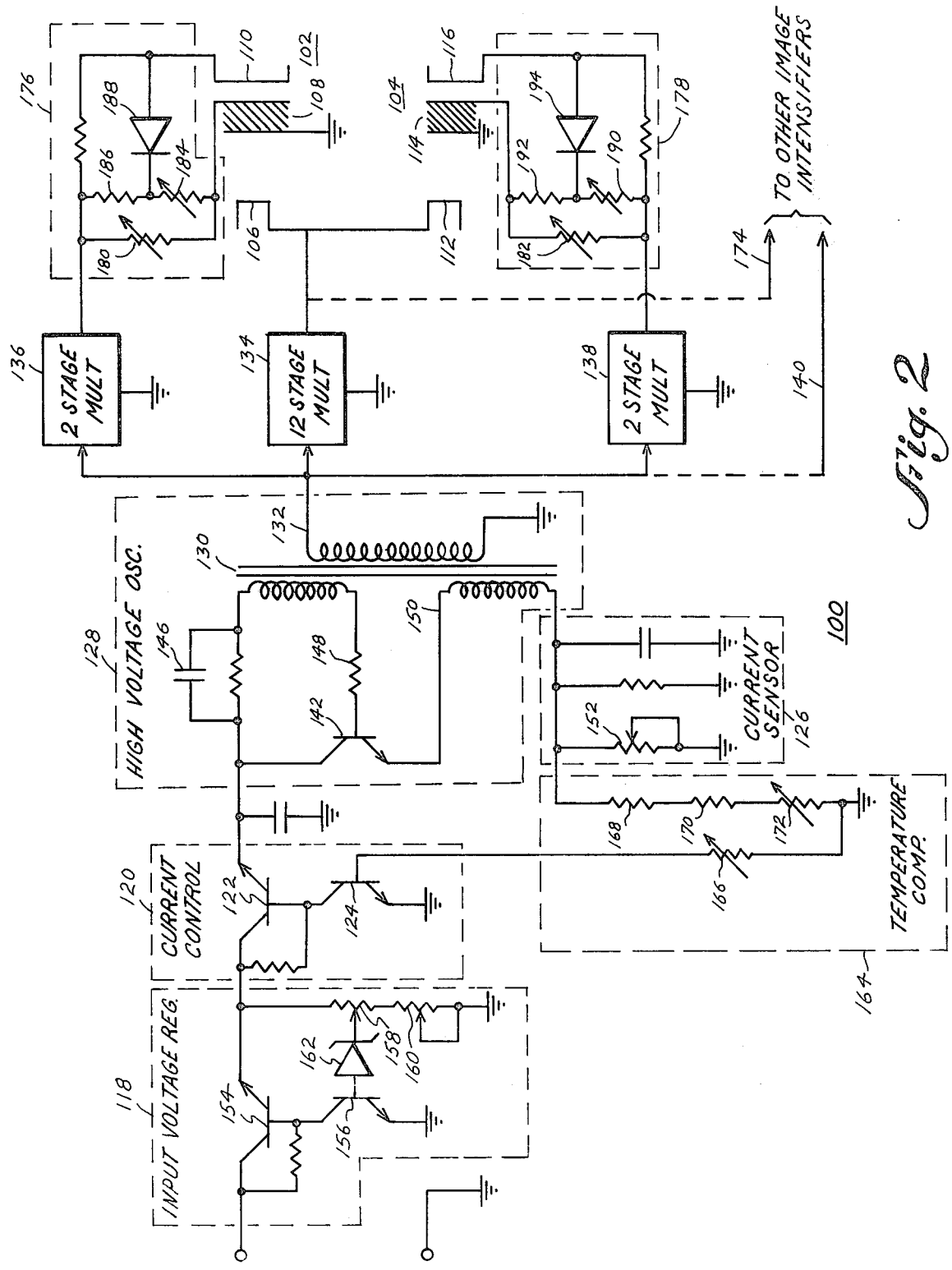
FIG. 2 is a circuit and block diagram of a power supply for operating a plurality of image intensifiers in accordance with the present invention.

Referring now to FIG. 2, a power supply for supplying regulated input voltages to a plurality of image intensifiers is illustrated generally at 100. In a night vision goggle system, two image intensifiers would be utilized in a binocular fashion. While a variety of image intensifier tubes are available, image intensifier tubes containing microchannel plate electron multipliers are particularly advantageously used hereby and are illustrated generally at 102 and 104. Image intensifier 102 includes a phosphor screen 106, microchannel plate 108 and cathode 110 while image intensifiers 104 includes a phosphor screen 112, microchannel plate 114 and cathode 116.

Operationally, a dc voltage input, which may be derived from a battery B is coupled to an input voltage regulator 118. Regulator 118 serves to compensate for variations in the input voltage supplied to current control circuit 120, which voltage variations would, in the absence of regulator 118, be caused by a decreasing battery voltage over a period of extended use, which in turn would result in a decrease in intensifier brightness with time. Input voltage regulator 118 is described in greater detail in copending U.S. patent application, Ser. No. 650,110, filed Jan. 19, 1976 now continuation Ser. No. 795,261, filed May 9, 1977 now abandoned and assigned to the same assignee as is the instant application.

Current control 120, comprising transistors 122 and 124 are coupled to a current sensing element in current sensor 126 in a feedback loop arrangement to provide a regulated control of the intensifier operating parameters in response to input illumination on the intensifier cathodes 110 and 116, and serves to keep the power supply input current below a predetermined maximum level. Thus, current stabilization in response to input illumination is provided by current control 120 while regulator 118 renders the intensifier gain characteristics independent of variation in input battery voltage. Current control 120 is described in greater detail in copending U.S. Pat. No. 4,037,132 issued July 19, 1977 and assigned to the same assignee as is the instant invention.

Current detector 126 detects changes in total tube power for the plurality of image intensifiers relative to changes in tube input illumination. These current changes are sensed in the low voltage power supply circuit and provide negative feedback to the current control 120 for controlling the input voltage to the power supply oscillator 128, which oscillator converts its low voltage dc input to a high voltage ac output on the secondary 132 of transformer 130. The oscillator 128 ac output drives high voltage multipliers 134, 136 and 138 for the illustrated embodiment including two or more intensifiers, but with provision available via line 140 for driving other high voltage multipliers. Multipliers 134, 136 and 138 convert the applied ac voltage to a high potential dc voltage, which is then coupled to the image intensifier tubes to provide proper operation. The high voltage oscillator 128 operation, current sensor 126 operation and the operation of multipliers 134, 136 and 138 are described in detail with reference to the aforementioned copending U.S. Pat. No. 4,037,132, issued July 19, 1977. Oscillator 128 is preferably a class C oscillator having a low source impedance. Transistor 142 is biased by resistor 144 and capacitor 146 in the active region and resistor 148 limits the applied base current to transistor 142. Load variations on the secondary 132 of transformer 130 are reflected back to the primary 150 and are sensed by detecting the voltage across resistor 152, which voltage is coupled to the base of current control transistor 124 as negative feedback such that increasing current through resistor 152 causes the voltage applied to oscillator 128 to decrease, which in turn regulates the current through resistor 152 at a constant value. Thus, the image intensifier tube light intensity is regulated.

Input voltage regulator 118 includes a regulating transistor 154 having negative feedback coupled to the base thereof from transistor 156. The variable base drive applied to transistor 154 from transistor 156 is adjustable by means of the voltage divider provided by resistors 158 and 160 coupled to transistor 156 via zener diode 162.

The image intensifier characteristics vary substantially with changes in ambient temperature. When microchannel plate electron multipliers such as image intensifiers 102 and 104 are utilized, a controlled variation in voltage applied to the cathodes and phosphor screens thereof is required to compensate for the changing characteristics of the materials used in the microchannel plate with temperature, which would otherwise result in undesirable variations in overall intensifier gain if such compensations were not provided. One such temperature varying characteristics is the microchannel plate strip resistance, which varies drastically with temperature. Compensation for variation of the microchannel plate gain characteristics with ambient temperature is provided by a temperature compensation circuit 164. Temperature compensation circuit 164 is described in greater detail in the aforementioned copending U.S. Pat. No. 4,037,132, issued July 19, 1977 and assigned to the same assignee as is the present application. Operationally, temperature compensation circuit 164 includes a negative voltage-temperature element such as thermistor 166 in the feedback loop to current control transistor 124 to provide a temperature varying potential to the base thereof. Thermistor 166 provides a voltage divider, together with resistors 168, 170 and 172 coupled to current sensing resistor 152. Various modifications of temperature compensation circuit 164 are described in the aforementioned copending U.S. Pat. No. 4,037,132, issued July 19, 1977 to provide temperature compensation over various temperature ranges.

The image intensifier operating voltages and currents are provided by multiplying and converting the ac voltage on the secondary 132 of transformer 130 to the requisite dc operating voltages by means of high voltage multipliers 132, 136 and 138. Multiplier 132 may, for example, comprise a twelve stage multiplier which multiplies and rectifies the 500 volt ac voltage on secondary 132 to derive the +6000 volt dc voltage which is coupled to the phosphor screens 106 and 112 of image intensifiers 102 and 104 in a two intensifier configuration, and to the screens of other image intensifiers, if desired, via line 174. Multipliers 136 and 138 may comprise two-stage multipliers which multiply and rectify the 500 volt ac voltage on secondary 132 to derive the −1000 volt dc voltages which are coupled to the microchannel plates 108 and 114 to the cathodes 110 and 116 via bright source protection circuits 176 and 178.

Figure 3:
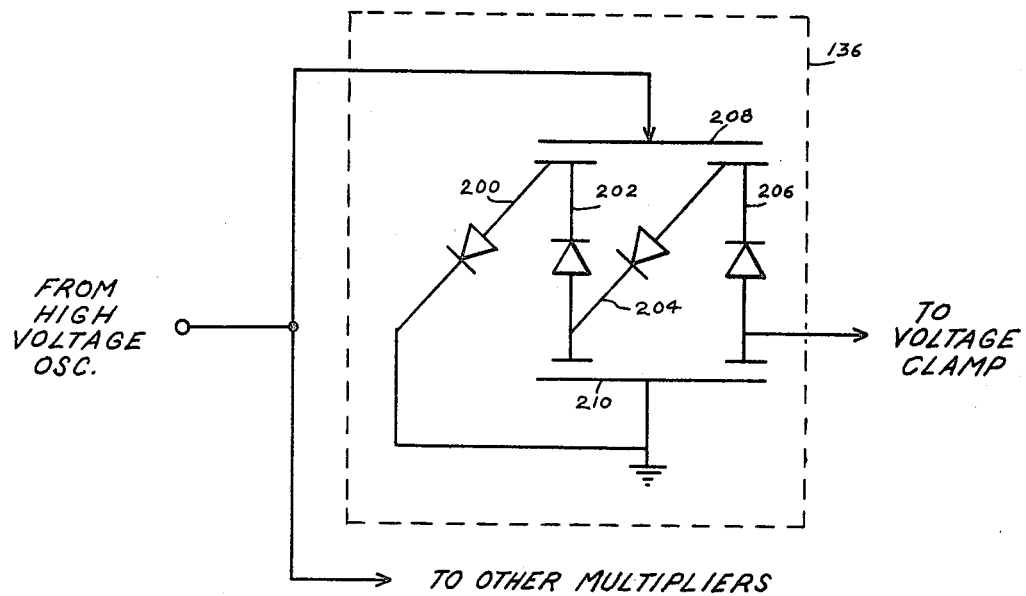
FIG. 3 is a simplified circuit diagram of a two-stage high voltage multiplier utilized by the present invention.

Referring now to FIG. 3, multiplier 136 is illustrated, and may comprise a pair of voltage doublers including diodes 200, 202, 204 and 206 and capacitors 208 and 210. Multipliers 138 and 134 are of substantially identical configuration, but with multiplier 134 including additional stages of voltage doublers to provide a higher voltage output.

Bright source protection circuits 176 and 178 are clamp circuits which maintain the image intensifier cathode voltages to within one to two volts of the desired cathode potential as the tube cathode current increases beyond some predetermined preset level, thereby protecting the cathodes 110 and 116 at high light levels. Bright source protection circuits 176 and 178 are described in detail in the aforementioned copending U.S. Pat. No. 4,037,132, wherein it is set forth that the overall intensifier gain level may be varied or set by adjusting the voltage level across the microchannel plate. In the present invention, this would be microchannel plates 108 and 114. This adjustment of the microchannel plate voltage level is accomplished by varying the resistance of resistor 180 for intensifier 102 and by varying the resistance of resistor 182 for intensifier 104. In accordance with the present invention, it has been discovered that the low light level gain of the intensifiers, which is adjustable by varying resistors 180 and 182; and the high light saturation levels of intensifiers 102 and 104 are independently adjustable. The high light saturation level of intensifier 102 is adjustable by varying the resistance of resistor 184, which together with resistor 186 forms a voltage divider coupled to the voltage clamp diode 188. The high light saturation level of intensifier 104 is adjustable by varying the resistance of resistor 190, which together with resistor 192 forms a voltage divider coupled to the voltage clamp diode 194. Thus, instead of the tedious and costly process of selecting image intensifiers having matching characteristics during manufacture or assembly, which typically vary widely; the present invention enables unmatched intensifiers, preferably of the microchannel type, to be utilized, for example, in pairs of goggles, with the low light level gain and high light saturation levels independently adjustable by a simple and inexpensive means to match the intensifier characteristics.

By including an additional multiplier 138 for an additional intensifier coupled to the power supply to supply the microchannel plate and control voltages to the second intensifier, a simplified power supply is provided for supplying at least two intensifiers by utilizing total current control to provide power to the two image intensifiers in a goggle system. Since the automatic brightness control is determined by the total effective power consumed by both image intensifier tubes, the proportional change in voltage on both intensifier tubes due to increasing light input is equalized. The use of separate multipliers 136 and 138 for each intensifier allows the saturation level and low light gain, i.e. from the microchannel plate voltage, to be independently set for each tube. Thus, in a goggle system, tubes having differing characteristics may be used and resistors 180, 184, 182 and 190 set during manufacture, or alternatively as potentiometers which may be field adjustable.

The bright source protection clamp voltage appearing across resistor 184 for intensifier 102 and across resistor 190 for intensifier 104, when varied, varies the high light level saturation of the respective intensifiers as aforementioned. Typically, resistors 184 and 190 are in the range of 50K-2 Megohm while resistors 180 and 182 are in the range of 50 Meg-100 Megohm.

While the present invention has been described in connection with a preferred embodiment thereof, it is to be understood that additional embodiments, modifications and applications which will become obvious to those skilled in the art are included within the spirit and scope of the invention as set forth by the claims appended hereto.

I claim:

1. A power supply for supplying operating power to a plurality of image intensifiers comprising:
   dc to ac converter means having an input coupled to a source of dc power and a high voltage ac output;
   voltage multiplication means for rectifying and multiplying said high voltage ac output to derive high voltage dc power for said image intensifiers;
   power sensing means coupled to said plurality of image intensifiers for detecting changes in intensifier operating power corresponding to changes in intensifier input illumination for deriving a feedback control signal proportional to the total power consumed by said plurality of image intensifiers;
   control means responsive to said control signal and coupled to said dc to ac converter means for providing automatic brightness control for said plurality of image intensifiers;
   means for independently adjusting the low light level gain of each of said image intensifiers; and
   means for independently adjusting the high light saturation level characteristic of each of said image intensifiers.

2. A power supply in accordance with claim 1 wherein said image intensifiers are of the type comprising microchannel plate electron multiplier having a cathode and a phosphor screen.

3. A power supply in accordance with claim 2 wherein said high voltage multiplication means includes:
   means for coupling a high voltage dc to the screens of said plurality of intensifiers; and
   independent voltage multiplication means for coupling high voltage dc to each of said image intensifier cathodes.

4. A power supply in accordance with claim 1 wherein said power sensing means is coupled to said dc to ac converter for detecting changes in dc input power prior to the conversion thereof to high voltage ac.

5. A power supply in accordance with claim 4 wherein said dc to ac converter means includes oscillator means for deriving an ac voltage from said dc input and transformer means for stepping up said derived ac voltage to said high voltage ac output.

6. A power supply in accordance with claim 5 wherein said power sensing means comprises a current sensor coupled to the primary side of said transformer and wherein said control means includes means for varying the input current to said high voltage oscillator in accordance with the variations in the output of said current sensing means.

7. A power supply in accordance with claim 6 further comprising:
temperature compensation means coupled in feedback relationship to said current sensing means and said current control means for providing a composite control signal to said current control means.

8. A power supply in accordance with claim 6 further including:
input voltage regulation means electrically coupled between said current control means and said input dc voltage to provide compensation for variations in said input dc voltage level.

9. A power supply in accordance with claim 1 wherein said source of dc power is a battery.

10. A power supply in accordance with claim 1 wherein said plurality of image intensifiers is two image intensifiers.

11. A night vision goggle system including two image intensifiers operable from a single power supply comprising:
a source of dc power;
dc to ac conversion means coupled to said dc source for providing an ac power output;
means for rectifying and multiplying said ac power output to provide a plurality of high voltage dc outputs;
means for coupling said high voltage dc outputs to said image intensifiers to provide the operating voltages therefor;
power sensing means for detecting changes in the composite image intensifier operating power of both image intensifiers corresponding to changes in input illumination for deriving a control signal;
power control means responsive to said control signal for regulating said ac power output of said dc to ac conversion means;
means for independently adjusting the low light level gain of each of said image intensifiers; and
means for independently adjusting the high light level saturation points of said image intensifiers.

12. A night vision goggle system in accordance with claim 11 wherein each of said image intensifiers are of the microchannel type and each include:
a phosphor screen;
a cathode; and
a microchannel plate therebetween.

13. A night vision goggle system in accordance with claim 12 wherein said means for coupling said high voltage dc outputs to said image intensifiers includes:
means for coupling one of said high voltage dc outputs to the screens of both of said image intensifiers; and
means for coupling other of said high voltage dc outputs to the cathodes of said image intensifiers.

14. A night vision goggle system in accordance with claim 11 wherein said means for rectifying and multiplying said ac power output includes a plurality of voltage double circuits.

15. A night vision goggle system in accordance with claim 11 wherein said source of dc power comprises a battery.

16. A night vision goggle system in accordance with claim 11 wherein said power control means comprises a current control circuit for regulating the input current to said dc to ac conversion means.

17. A night vision goggle system in accordance with claim 16 wherein said power sensing means is coupled to the low voltage side of said dc to ac conversion means.

18. A night vision goggle system in accordance with claim 17 wherein said dc to ac conversion means comprises a high voltage oscillator including a transformer for deriving said high voltage ac output, and wherein said power sensing means is coupled to the primary of said transformer.

19. A night vision goggle system in accordance with claim 11 further comprising:
temperature compensation means coupled to said power sensing means for varying said control signal coupled to said dc to ac conversion means in accordance with temperature induced changes in the characteristics of said image intensifiers.

20. A night vision goggle system in accordance with claim 11 further comprising:
input voltage regulation means coupled to said power control means to provide compensation for variations in said source of dc power.

21. A method for supplying operating power to a plurality of image intensifiers comprising the steps of:
converting a lower voltage dc input derived from a source of dc power to a high voltage ac output by a dc to ac converter;
rectifying and multiplying said high voltage ac output to derive high voltage dc power for said image intensifiers;
detecting changes in intensifier operating power corresponding to changes in intensifier input illumination for deriving a feedback control signal proportional to the total power consumed by said plurality of image intensifiers;
controlling said dc to ac converter response to said control signal for providing automatic brightness control for said plurality of image intensifiers;
independently adjusting the low light level gain of each of said image intensifiers; and
independently adjusting the high light saturation level characteristic of each of said image intensifiers.

22. A method in accordance with claim 21 wherein said changes in dc input power are detected prior to the conversion thereof to high voltage ac.

23. A method in accordance with claim 22 wherein said ac voltage derived from said dc input stepped up by a transformer to said high voltage ac output.

24. A method in accordance with claim 23 wherein said detecting step includes sensing the current coupled to the primary side of said transformer and wherein said controlling step includes varying the input current to said dc to ac converter in accordance with variations in the output of said sensed current.

25. A power supply in accordance with claim 24 further comprising the step of:
providing temperature compensation in feedback relationship with said sensed current to provide a composite control signal.

26. A method in accordance with claim 24 further comprising the step of:
regulating the input voltage to provide compensation for variations in said source of dc power.

* * * * *